Patented Jan. 28, 1947

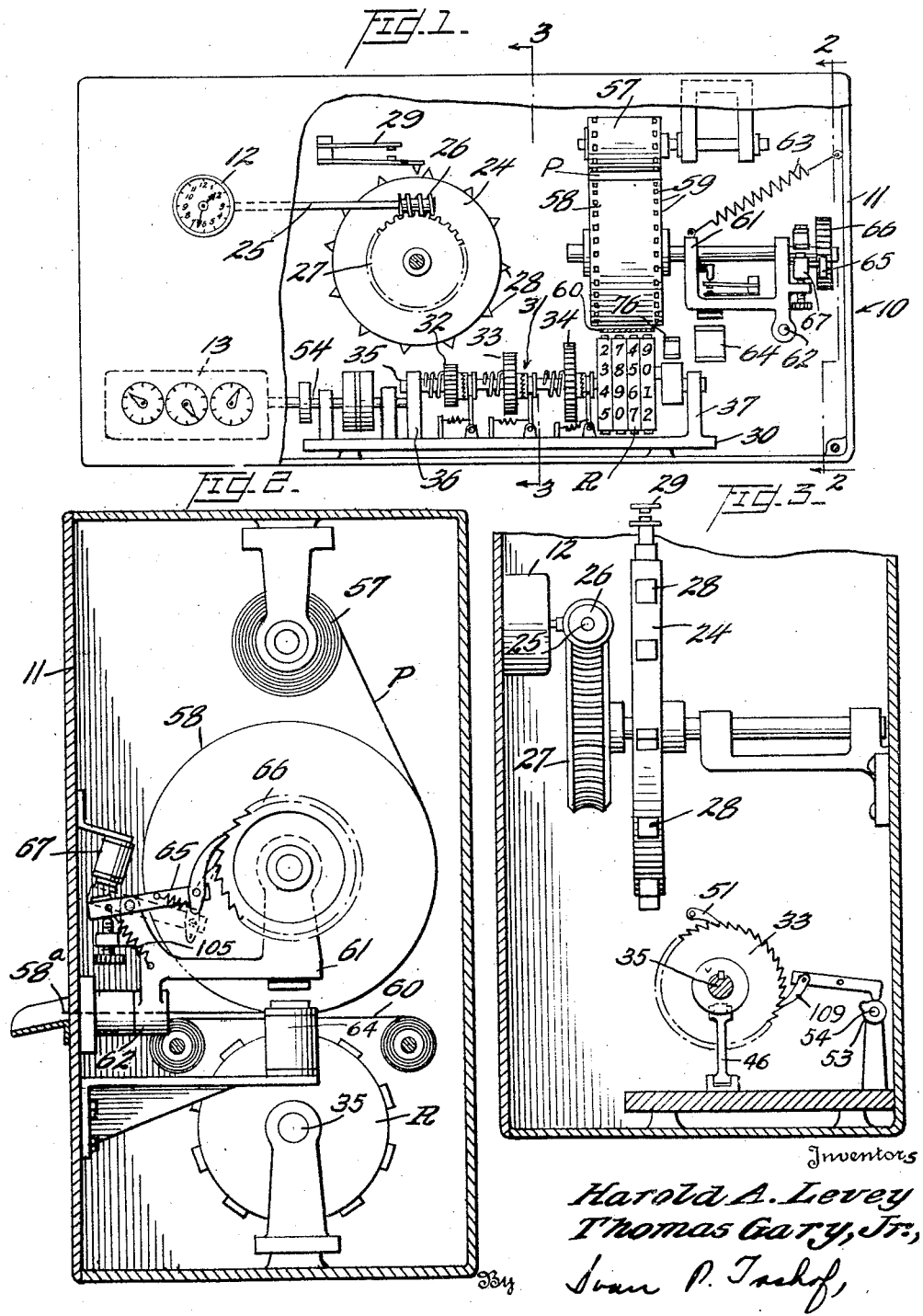

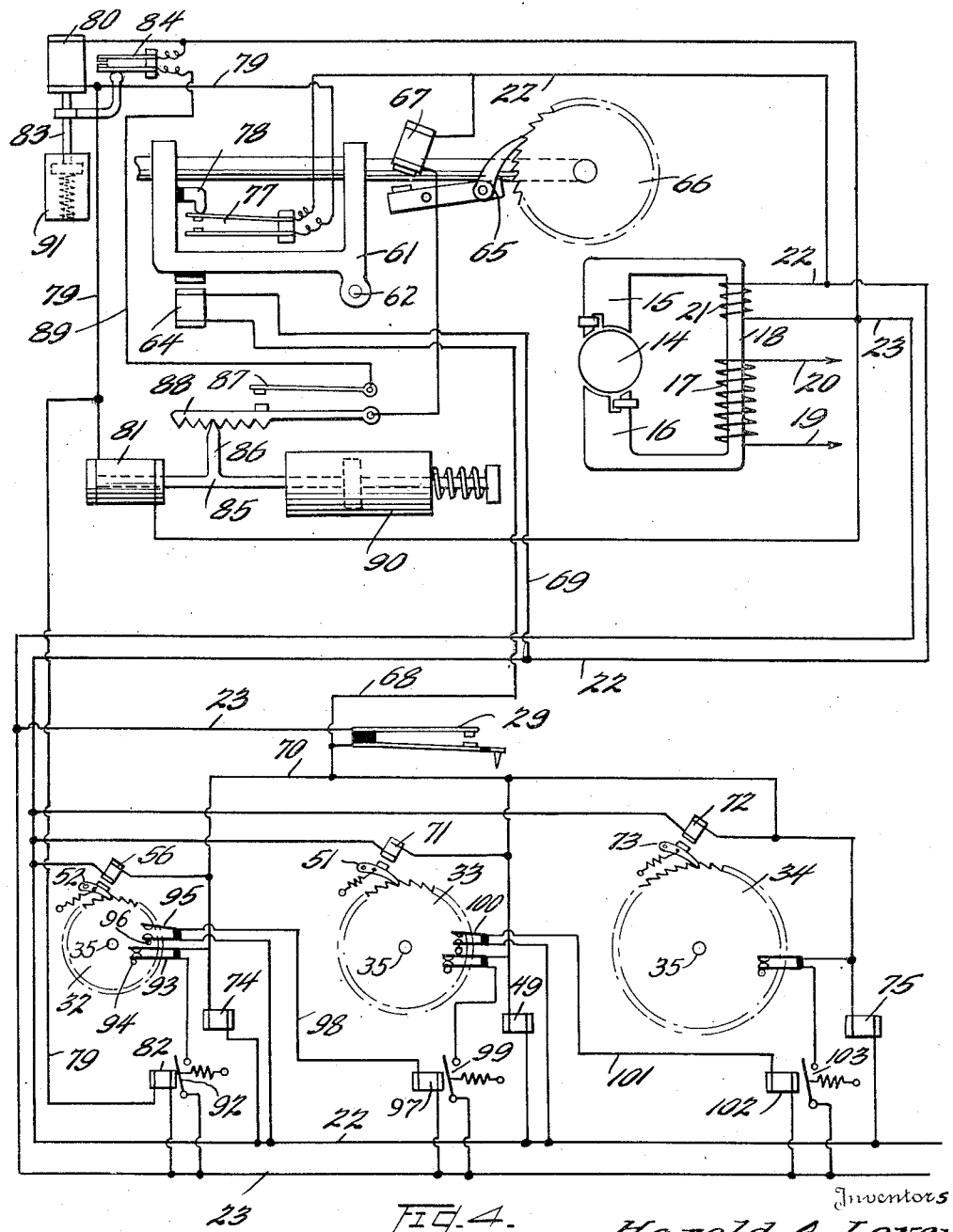

2,414,821

UNITED STATES PATENT OFFICE 2,414,821

COMPUTING AND BILLING METER

Harold A. Levey, New Orleaans, La., and Thomas Gary, Jr., Beaumont, Tex.; said Levey assignor to Jessie A. Howard, Beaumont, Tex.

Application September 2, 1943, Serial No. 501,000

7 Claims. (Cl. 234—58)

The present invention relates to a computing and billing meter. More particularly, the present invention relates to a device for automatically issuing printed bills at desired intervals corresponding to the amount of electric current, gas or water used by a household or business establishment.

It is one of the objects of the present invention to provide a device of the character described which will be energized each month or other interval to print a bill accurately equivalent to the service rendered.

A further object of the present invention is to provide a device which will compute and print a sum varying with the amount of current used or service rendered so that a sliding rate can be imposed depending on the amount of current used.

A third object of the present invention is to provide a device which will be operated entirely from a synchronous motor clock.

A fourth object of the present invention is to provide a device of the character described wherein means are provided for feeding a bill at monthly or other intervals, and at the same time resetting the rate computing means to start a new monthly cycle.

A fifth object of the present invention is to provide a plurality of rate computing means successively rendered operative to change the effective rate as each desired quantity of electricity, gas or the like is used.

A sixth object of the present invention is to provide a plurality of computing wheels on a single shaft, each capable of driving the shaft to establish a new rate and each energized by a previously operative wheel.

A seventh object of the present invention is to provide an electrical system for meters or the like wherein the energy for the system is supplied by a secondary coil on an electric clock field core, said clock forming a part of the system.

Other objects and advantages will be evident from subsequent description and figures of the drawings, wherein:

Fig. 1 is a front elevation partially broken away of the meter of the present invention;

Fig. 2 is a section taken on the line 2—2 of Fig. 1;

Fig. 3 is a section taken on the line 3—3 of Fig. 1;

Fig. 4 is a diagrammatic showing of the operating circuit of the meter;

Figure 5:
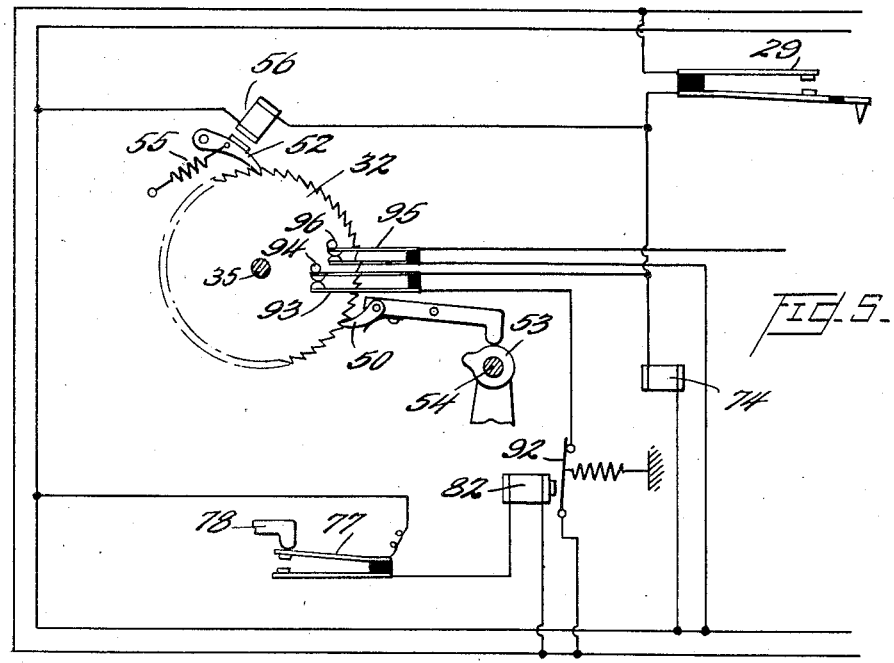
Fig. 5 is an enlarged diagrammatic showing of one of the computing wheels in fully advanced position, and a portion of the circuit of the meter.

Referring to the figures of the drawings, and particularly Fig. 1 thereof, the meter of the present invention is indicated in general at 10 and includes a casing 11. Mounted within the casing 11 is an electric clock 12 and a conventional measuring meter 13 for gas, electricity or the like. The electric clock is preferably of the synchronous self-starting type provided with spring driving means to run the same for a considerable period in the event of current failure. The clock motor is diagrammatically shown in Fig. 4 and includes an armature 14 and poles 15 and 16. A field coil 17 is wound around the core 18 connecting the poles, each of the ends 19 and 20 of the coil 17 being connected to a conventional A. C. source of the customary 110 volts. The core 18 also carries a secondary coil 21, which is adapted to supply a six volt current to the leads 22 and 23 for energizing the various electromagnets of the meter, as will be hereinafter set forth.

The casing 11 also carries a calendar wheel 24 driven from the clock motor by a shaft 25 having a driving worm 26 meshing with a gear 27 carried by the calendar wheel. The drive for the calendar wheel is so proportioned that the wheel makes one revolution per year. Spaced around the periphery of the calendar wheel are a number of projections 28 corresponding to the months of the year. These projections are therefore spaced varying amounts so that each projection will operate the switch 29 at a time corresponding to the first day of each month or some other predetermined billing day. Preferably also the calendar wheel is connected to the gear 27 by a clutch (not shown), or some other means, for allowing adjustment each four years on leap year is provided. The clock switch 29 upon closure will operate the various members of the billing meter, as will be hereinafter set forth.

Figure 6:
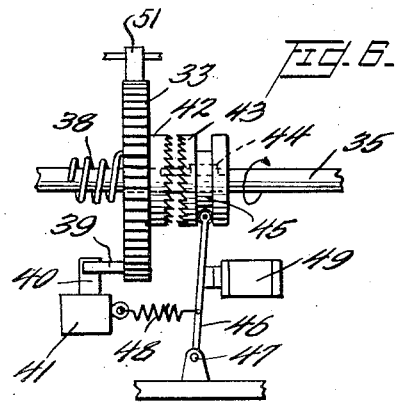
Fig. 6 is a detail of one of the computing wheels and cooperating clutch.

Also supported within the casing 11 as by a base member 30 is a computing mechanism indicated in general at 31. This computing mechanism includes a plurality of rate computing ratchet wheels 32, 33 and 34 mounted loosely upon a shaft 35 supported by the bearing members 36 and 37. A detail of one of the computing wheels, 33, is shown in Fig. 6 and it will be noted that a return spring 38 is fastened at one end to the wheel 33 and at the other end to the shaft 35. The spring 38 normally urges the wheel 33 to a zero position determined by the stop 39 on the wheel 33 and the stop 46 supported by a stationary member 41. The other side of the wheel 33 carries one portion 42 of a clutch. The other portion 43 of the clutch is slidably carried on the shaft 35, being incapable of rotation relative to the shaft. This is due to a splined connection indicated at 44. A movable sleeve 45 is mounted about the clutch member 43 and serves to move the clutch member 43 toward engagement with the clutch member 42 when the lever 46 is moved in a counter-clockwise direction about the pivot 47. A spring 48 is provided for moving the lever 46 in counter-clockwise direction and an electromagnet 49 is provided for moving the lever 46 in a clockwise direction.

It will thus be evident that when the electromagnet 49 is energized the lever 46 will be moved to disengage the clutch members 42 and 43 and when the electromagnet is not energized the clutch members will be engaged. When the clutch members are engaged the wheel 33 can then drive the shaft 35 and when the clutch members are out of engagement the wheel will be returned to zero position by the spring 38.

Referring to Figs. 3 and 5, it will be noted that the wheel 33 and the wheel 32 are provided with actuating pawls 109 and 50 respectively and backstop pawls 51 and 52 respectively. Referring in particular to Fig. 5, it will be noted that the pawl 50 is driven from the cam 53 on the shaft 54, the shaft 54 being driven from the meter 13 (Fig. 1). The backstop pawl 52 is pressed against the wheel 32 by a spring 55 and prevents backward motion of the wheel 32. It will be understood that each of the wheels 32, 33 and 34 is similarly driven and adapted to be selectively coupled to the shaft 35 by the corresponding clutch. A plurality of electromagnets 56, 71, 72 are also provided similar to the magnet 56 of Fig. 5 to remove the backstop pawls 52, 51 and 73 from effective operation.

The ratchet wheels 32, 33 and 34 are each provided with a different number of teeth, so that as each is caused to turn the shaft 35, the shaft will be turned a greater or smaller amount. This will enable a different rate to be recorded by the printing wheels indicated in general in Fig. 1 by the reference character R. These printing wheels are of a conventional type and are adapted to impress the sum recorded on bill paper P carried by the roll 57. The paper P is moved into the proper position and out of the discharge opening 58a by a roll 58 having suitable teeth 59 in the periphery cooperating with openings in the paper. Preferably the paper is carried in triplicate interleaved with carbon paper so that a plurality of bills are printed. The printing wheels R are inked by a suitable ribbon 60.

The roll 58 is carried by a frame 61 pivoted on a pivot 62. The frame 61 is normally held away from printing wheels R by a spring 63 and is moved against the wheels R by an electromagnet 64. The feed roll 58 is moved by a pawl 65 cooperating with a ratchet 66 on the roll 58. The pawl 65 is brought into engagement by a spring 105. The pawl 65 is moved on the backstroke by an electromagnet 67 and on the forward or feeding stroke by the spring 105.

The operation of the present device may be best understood by referring to Fig. 4. As there shown, when the clock operated switch 29 is closed a circuit is established from one side 23 of the 6-volt line through the switch 29 into wire 68 into electromagnet 64 and through wire 69 into the other side of the line 22. The electromagnet 64 pulls the printing frame 61 downwardly to print the designation on the printing wheels R (Figs. 1, 2). At the same time the clock switch 29 establishes a circuit from line wire 23 through wire 70 through electromagnets 56, 71 and 72, each releasing backstop pawls 52, 51 and 73 respectively for the computing wheels 32, 33 and 34 respectively. The wire 70 also establishes a circuit from line wire 23 through electromagnets 74, 49 and 75, which release the clutches of each of the computing wheels so that the wheels are each returned to zero position. If desired the printing wheels may be provided with a conventional resetting mechanism indicated at 76 in Fig. 1, so that they are also reset at this time.

The movement of the printing frame 61 downwardly operates a frame switch 77 due to the movement of the nose 78 on the printing frame. This will establish a circuit from one side of the line 22 through the switch 77 and wire 79 through the solenoids 80, 81 and 82 which have their other terminals connected to the line 23. The solenoid 80 will through its movable core piece 83 close switch 84. The solenoid 81 will at the same time pull the movable core piece 85 to the left causing the nose 86 to close and open switch 87 a plurality of times by the action of the rack 88. The closing of the switch 87 will in turn close a circuit from line wire 23 and the switch 84 and through wire 89 to one side of the solenoid 67 operating the pawl 65 and thence to line wire 22. This will feed the bill paper P by moving ratchet 66. This action is prolonged sufficiently by the dash pots 90 and 91.

The energization of solenoid 82 will break the circuit through the solenoids 56 and 74 by opening switch 92. This circuit from line 23 to line 22 normally energizes the solenoids 74 and 56 through the switch 93 kept closed by a pin 94 on the wheel 32 when the wheel is in zero position. This action will clutch the wheel to the shaft 35, as previously described for the corresponding mechanism of Fig. 6, to drive the same at the initial charge rate. When the wheel 32 has made a substantially complete revolution as shown in Fig. 5, the switch 93 is again closed to permit the wheel 32 to return to zero as previously described for the corresponding mechanism of Fig. 6. At the same time switch 95 is closed by pin 96 (in a different plane from pin 94 and switch 93). When the switch 95 is closed solenoid 97 is energized through wire 98 connected to the switch 95. The action of solenoid 97 opens switch 99 which breaks the circuit through solenoids 49 and 71 to allow wheel 33 to drive shaft 35 at a new rate. Similarly, when wheel 33 reaches the end of its movement switch 100 is closed to establish a circuit through wire 101 to solenoid 102 which opens the switch 103 to start the final rate wheel 34. As may be understood, any desired number of rate wheels may be used.

What is claimed is:

1. In a billing meter, means for measuring an amount of service rendered and including means rotated in accord with the service, a printing means including a plurality of rotatable members movable to total a sum equivalent to the service rendered at a plurality of rates, a shaft connected to said members to rotate the same, a plurality of computing members loosely mounted on said shaft and each capable of driving the shaft at a different rate, means for rotating said computing members from said second mentioned means, a plurality of means each for connecting one of said computing members selectively to the shaft to rotate the same, time controlled means for rendering the printing means operative and simultaneously operating one of said connecting means to connect a first one of said computing members to the said shaft for driving the same, means on said first computing member to render said first connecting means inoperative upon a predetermined rotational movement, and to render one of said connecting means for a second computing member operative.

2. In a billing meter, means for measuring an amount of service rendered and including a first rotatable means rotated in accordance with the service, a shaft, a plurality of computing wheels releasably mounted on said shaft, variable transmission means between the first rotatable means and the computing wheels on the shaft, means for successively connecting each of said computing wheels to the shaft whereby the shaft is driven at different angular velocities, and printer means connected to the computing wheels for recording the values indicated thereby.

3. In a billing meter, means for measuring an amount of service rendered and including a first rotatable means rotated in accordance with the service, a shaft, a plurality of computing wheels mounted on the shaft, clutch means between each wheel and the shaft, means for operating each of said clutch means, variable transmission means between the first rotatable means and the computing wheels on the shaft, means including said clutch operating means for successively connecting each of said computing wheels to the shaft whereby the shaft is driven at different angular velocities, and printer means connected to the computing wheels for recording the values indicated thereby.

4. In a billing meter, means for measuring an amount of service rendered and including a first rotatable means rotated in accordance with the service, a shaft, a plurality of computing wheels mounted on the shaft, clutch means between each wheel and the shaft, means for operating said clutch means, means interposed between each wheel and the shaft biasing the wheel to zero position, latching means for latching the wheels in instantaneous positions, means for operating said latching means, variable transmission means between the first rotatable means and the computing wheels on the shaft, whereby the shaft is driven at different angular velocities, and means including the clutch and latch operating means for releasing the wheels for return to zero position under the actions of said biasing means, and printer means connected to the computing wheels for recording the values indicated thereby.

5. In a billing meter, means for measuring an amount of service rendered and including a first rotatable means rotated in accordance with the service, a shaft, a plurality of computing wheels mounted on the shaft, clutch means interposed between each wheel and the shaft, means for operating said clutch means, variable transmission means between the first rotatable means and the computing wheels on the shaft, zeroizing means for returning all wheels to initial position, means for energizing the clutch operating means for a first wheel to connect same to the shaft, means operated by the first wheel and connected to the clutch operating means for a second wheel for connecting said second wheel to the shaft when the first wheel has completed a revolution, and printer means connected to the computing wheel for recording the values indicated thereby.

6. In a billing meter, means for measuring an amount of service rendered and including a first rotatable means rotated in accordance with the service, a shaft, a plurality of computing wheels mounted on the shaft, clutch means interposed between each wheel and the shaft, means for operating said clutch means, variable transmission means between the first rotatable means and the computing wheels on the shaft, zeroizing means for returning all wheels to initial position, means for energizing the clutch operating means for a first wheel to connect same to the shaft, means operated by the first wheel and connected to the clutch operating means therefor for releasing the wheel from the shaft when the wheel has made a revolution, means operated by the first wheel and connected to the clutch operating means for a second wheel for connecting said second wheel to the shaft when the first wheel has completed a revolution, and printer means connected to the computing wheels for recording the values indicated thereby.

7. In a billing meter, means for measuring an amount of service rendered and including a first rotatable means rotated in accordance with the service, a shaft, a plurality of computing wheels mounted on the shaft, clutch means between each wheel and the shaft, means for operating said clutch means, means interposed between each wheel and the shaft biasing the wheel in zero position, latching means for latching the wheels in instantaneous position, means for operating said latching means, variable transmission means between the first rotatable means and the computing wheels on the shaft whereby the shaft is driven at different angular velocities, and zeroizing means including the clutch and latch operating means for releasing the wheels for return to initial position under the action of said biasing means, means for energizing the clutch operating means for a first wheel to connect same to the shaft, means operated by the first wheel and connected to the clutch operating means therefor for releasing the wheel from the shaft when the wheel has made a revolution, means operated by the first wheel and connected to the clutch operating means for a second wheel for connecting said second wheel to the shaft when the first wheel has completed a revolution, and printer means connected to the computing wheels for recording the values indicated thereby.

HAROLD A. LEVEY.
THOMAS GARY, Jr.